United States Patent
Singh et al.

(12) United States Patent (10) Patent No.: US 12,456,024 B1
(45) Date of Patent: Oct. 28, 2025

(54) SYSTEMS AND METHODS FOR PROCESSING FINANCIAL ARTICLES

(71) Applicant: Capital One Services, LLC, McLean, VA (US)

(72) Inventors: Damandeep Singh, Herndon, VA (US); David Kelly Wurmfeld, Fairfax, VA (US); Regina Wingate, Arlington, VA (US); Son Mays, Ashburn, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/909,387

(22) Filed: Oct. 8, 2024

(51) Int. Cl.
*G06K 7/14* (2006.01)
*G07F 19/00* (2006.01)

(52) U.S. Cl.
CPC ......... *G06K 7/1443* (2013.01); *G07F 19/203* (2013.01)

(58) Field of Classification Search
CPC .............................. G06K 7/1443; G07F 19/203
USPC .................................................. 235/379, 381
See application file for complete search history.

(56) References Cited

U.S. PATENT DOCUMENTS

| | | | |
|---|---|---|---|
| 6,637,576 B1 * | 10/2003 | Jones | G07F 19/20 194/216 |
| 7,635,082 B2 | 12/2009 | Jones | |
| 8,413,888 B2 | 4/2013 | Jones | |
| 9,070,125 B1 | 6/2015 | Folk et al. | |
| 11,222,326 B1 | 1/2022 | Wurmfeld | |
| 11,721,155 B2 | 8/2023 | Wurmfeld et al. | |
| 2006/0169770 A1 * | 8/2006 | Koshizuka | G07D 11/10 235/379 |
| 2017/0004666 A1 * | 1/2017 | Jang | G07D 11/0096 |
| 2020/0027319 A1 * | 1/2020 | Beskitt | G07F 19/202 |

FOREIGN PATENT DOCUMENTS

WO 2013028130 A1 2/2013

* cited by examiner

*Primary Examiner* — Daniel A Hess
(74) *Attorney, Agent, or Firm* — TROUTMAN PEPPER LOCKE LLP; Christopher J. Forstner; John A. Morrissett (57) ABSTRACT

A system may include a housing having an external aperture, a plurality of financial article handling units each configured to form an interface with the external aperture, processor(s), an image capture device, and a memory in communication with the processor(s) and storing instructions configured to cause the system to process financial articles. The system may cause the image capture device to capture a first machine-readable code including a request having a first amount and a first currency. Responsive to capturing the first machine-readable code, the system may determine a first financial article handling unit that corresponds to the first currency, position the plurality of financial article handling units such that the first financial article handling unit is in communication with the external aperture, and dispense the first amount of the first currency from the first financial article handling unit via the external aperture.

20 Claims, 6 Drawing Sheets

SYSTEMS AND METHODS FOR PROCESSING FINANCIAL ARTICLES

FIELD

The present disclosure relates generally to systems and methods for processing financial articles, and particularly to systems and methods for processing various foreign currencies and/or denominations of financial articles.

BACKGROUND

Automatic teller machines (ATMs) and other types of self-service financial devices have become a ubiquitous part of everyday life. Self-service devices, such as kiosks, are widely used to make transactions with a variety of financial instruments because they often provide for quick, easy, and more convenient service than, for example, interaction at a bank with a teller. Currently, however, these types of devices have some shortcomings that simply cannot match the level of service provided when making a transaction with an actual bank teller. For instance, the majority of transactions conducted at ATMs are to receive cash or other financial instruments (e.g., withdrawals). As such, the need is great to keep ATMs stocked to meet the demand of such transactions. Compared to a bank, the storage capacity of an ATM is low, often requiring routine service by a qualified technician.

Every time an ATM needs to be refilled and/or serviced, the downtime is costly to the customers who wish to use the ATM as well as the owners of the ATM. As such, it is desirable to minimize ATM downtime by increasing the storage capacity of an ATM. However, ATMs exist in areas where the useable footprint is low. Because most ATMs reside in public, highly trafficked areas, there is little room to expand the physical space and/or volume of ATMs.

Furthermore, replacing existing in-service ATMs with newer or revised ATMs would require a large amount of capital and time investment compared to upgrading the current in-service ATMs.

Accordingly, there is a need for improved systems and methods that provide for processing of financial articles. Embodiments of the present disclosure are directed to this and other considerations.

SUMMARY

Disclosed embodiments provide systems and methods for processing financial articles.

An embodiment of the present disclosure may provide a system, including: a housing; an external aperture on an external face of the housing, the external aperture connecting to an interior of the housing; a plurality of financial article handling units each configured to form an interface with the external aperture and to dispense a first amount of a respective currency via the external aperture; one or more processors in communication with the external aperture and the plurality of financial article handling units; an image capture device; and a memory in communication with the one or more processors and storing instructions that, when executed by the one or more processors, are configured to cause the system to process financial articles. The system may cause the image capture device to capture, via a first user device, a first machine-readable code, wherein the first machine-readable code includes a request including the first amount and a first currency. Responsive to capturing the first machine-readable code, the system may determine a first financial article handling unit of the plurality of financial article handling units that corresponds to the first currency; position the plurality of financial article handling units within the interior of the housing such that the first financial article handling unit is in communication with the external aperture; and dispense the first amount of the first currency from the first financial article handling unit via the external aperture.

Another embodiment of the present disclosure may provide a system, including: a housing; an external aperture on an external face of the housing, the external aperture connecting to an interior of the housing; a plurality of financial article handling units each configured to form an interface with the external aperture and to dispense a respective currency via the external aperture, and each having one or more trays each including a respective denomination of the respective currency; one or more processors in communication with the external aperture and the plurality of financial article handling units; an image capture device; and a memory in communication with the one or more processors and storing instructions that, when executed by the one or more processors, are configured to cause the system to process financial articles. The system may cause the image capture device to capture, via a first user device, a first machine-readable code, wherein the first machine-readable code includes a request including a first denomination of a first currency. Responsive to capturing the first machine-readable code, the system may determine a first financial article handling unit of the plurality of financial article handling units that corresponds to the first currency; position the tray(s) of the first financial article handling unit such that a first tray is in communication with the external aperture, the first tray including the first denomination; and dispense the first denomination of the first currency from the first financial article handling unit via the external aperture.

Another embodiment of the present disclosure may provide a first computing device, including: a housing; a display; an external aperture on an external face of the housing, the external aperture connecting to an interior of the housing; a plurality of financial article handling units each configured to form an interface with the external aperture and to dispense a respective currency via the external aperture; one or more processors in communication with the external aperture and the plurality of financial article handling units; and a memory in communication with the one or more processors and storing instructions that, when executed by the one or more processors, are configured to cause the first computing device to process financial articles. The first computing device may generate a first machine-readable code including identification data of the first computing device. The first computing device may display the first machine-readable code via the display. The first computing device may receive, from a first user device, a request comprising a first currency. Responsive to receiving the request, the first computing device may determine a first financial article handling unit of the plurality of financial article handling units that corresponds to the first currency; position the plurality of financial article handling units within the interior of the housing such that the first financial article handling unit is in communication with the external aperture; and dispense a first amount of the first currency from the first financial article handling unit via the external aperture.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Traditional self-service financial devices, such as ATMs, present challenges in terms of capability, supply, and storage volume. These devices can require significant downtime to refill and keep operational, reducing the convenience that they may otherwise provide compared to bank tellers. Additionally, currently in-service devices, such as ATMs, have a limited footprint, meaning upgrading existing devices has a large associated monetary and time cost. As such, it is desirable to maximize the storage space of in-service devices, thus extending uptime, while operating within the existing footprint in public spaces.

Accordingly, examples of the present disclosure can include systems and methods for processing financial articles (e.g., cash). When in use, the financial article processing devices can be configured to receive and/or dispense financial articles through an external aperture. The external aperture (e.g., a shutter) can be connected to a plurality of financial article handling units disposed within the interior of the device housing. These financial article handling units can be disposed on a track, a rotary table, or any type of moveable component configured such that the system can move each of the financial article handling units around within the housing interior, and make selections as to which financial article handling unit to align with the external aperture for a given transaction and/or request, as further discussed below.

For ease of explanation, the systems and methods disclosed herein may be described with respect to an ATM. One of skill in the art will recognize, however, that the disclosure is not so limited and that the systems and methods could also be used on other applications, such as self-service kiosks, a grocery self-checkout system, a vending machine, a ticketing booth, etc. These, and other applications, are contemplated herein.

In addition, although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

The present disclosure can include a financial article processing device. The device can include a housing with an image capture device, a display, and/or an external aperture on an external face of the housing. The housing can define an interior volume, in which a plurality of financial article handling units can be disposed. Each of the financial article handling units can be configured to form an interface with the external aperture such that each can receive and/or dispense different amounts of various currencies.

The device can further include a processor(s) in communication with the external aperture and the plurality of financial article handling units, and a memory storing instructions to be executed by the processor(s). The instructions, when executed by the processor(s), can cause the financial article handling device to capture a machine-readable code (e.g., a Quick Response (QR) code) including a request. The request may include an amount, a currency, and/or a denomination. In response, the instructions can cause the processor(s) to determine which of the financial article handling units corresponds to the requested amount, currency, and/or denomination, and to position the determined financial article handling unit within the housing interior such that it may be in communication with the external aperture for handling the request (e.g., dispensing a requested amount of a certain currency).

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
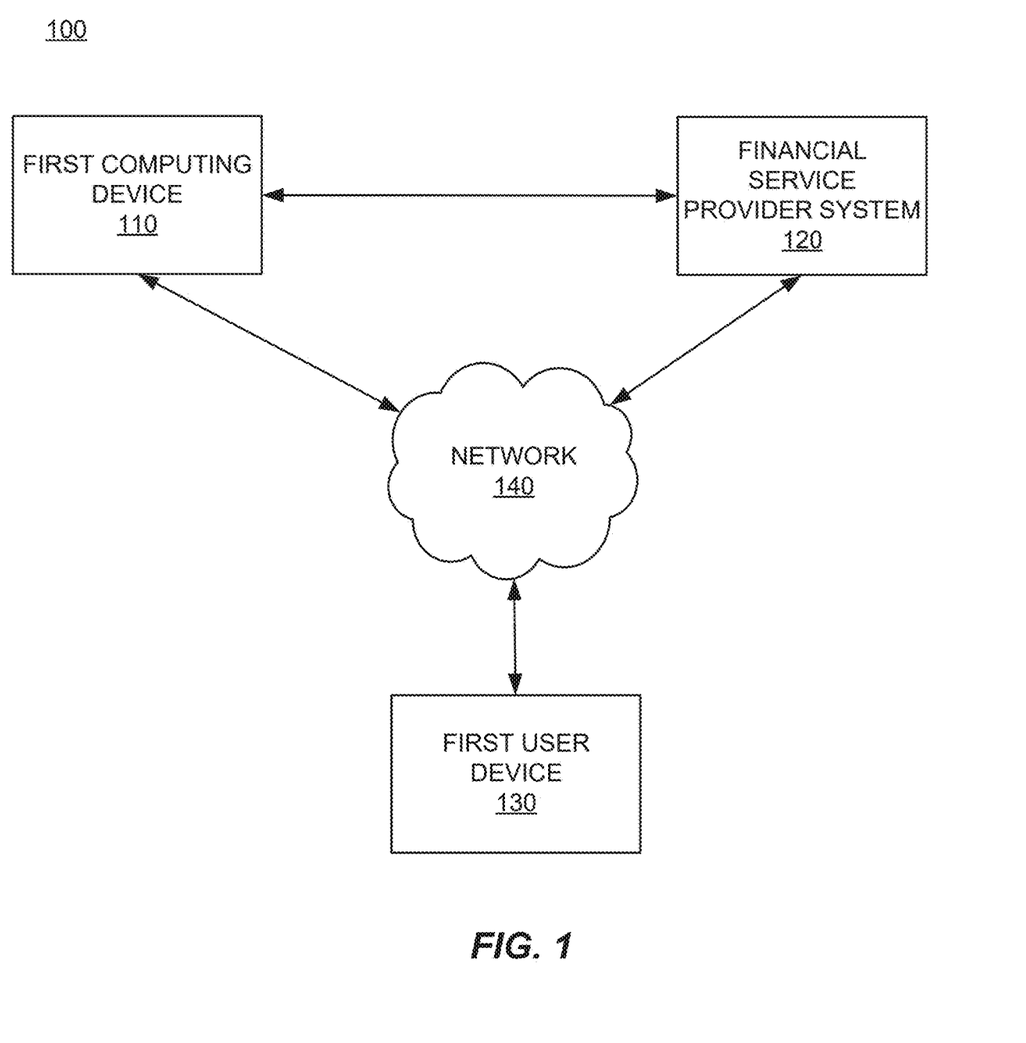
FIG. 1 is a block diagram of an example system environment that may be used to implement one or more embodiments of the present disclosure.

FIG. 1 is a diagram of an example system environment that may be used to implement one or more embodiments of the present disclosure. The components and arrangements shown in FIG. 1 are not intended to limit the disclosed embodiments as the components used to implement the disclosed processes and features may vary.

In accordance with disclosed embodiments, system 100 may include a first computing device 110 (as will be discussed in more detail below with reference to FIG. 2) that may be in communication (either directly or via a network 140) with a financial service provider system 120. System 100 may also include a first user device 130 (as will be discussed in more detail below with reference to FIG. 5) that may be in communication (either directly or via network 140) with financial service provider system 120 and/or first computing device 110.

In certain embodiments, financial service provider system 120 may store and/or have access to detailed customer information, such as account information. Financial service provider system 120 may communicate with first computing device 110 to correlate compiled data, analyze the compiled data, arrange the compiled data, generate derived data based on the compiled data, and store the compiled and derived data in a database. Financial service provider system 120 may also communicate with first computing device 110 and/or first user device 130 to provide one or more graphical user interface (GUI) displays to enable a user to input data, search for data, transfer data, and transmit and receive payments.

First user device 130 may be a mobile computing device (e.g., a smart phone, tablet computer, smart wearable device, portable laptop computer, voice command device, wearable augmented reality device, or other mobile computing device), a stationary device (e.g., desktop computer), or any other device capable of communicating with network 140 and ultimately communicating with one or more components of system 100. In some embodiments, first user device 130 may include or incorporate electronic communication devices for hearing or vision impaired users. First user device 130 may be operated by a user, which may include individuals such as, for example, subscribers, clients, prospective clients, or customers of an entity associated with an organization, such as individuals who have obtained, will obtain, or may obtain a product, service, or consultation from an entity associated with system 100. According to some embodiments, first user device 130 may include an environmental sensor for obtaining audio or visual data, such as a microphone and/or digital camera, a geographic location sensor for determining the location of the device, an input/output ("I/O") device such as a transceiver for sending and receiving data, a display for displaying digital images, one or more processors including a sentiment depiction processor, and a memory in communication with the one or more processors.

Network 140 may be of any suitable type, including individual connections via the internet such as cellular or WiFi™ networks. In some embodiments, network 140 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Figure 2:
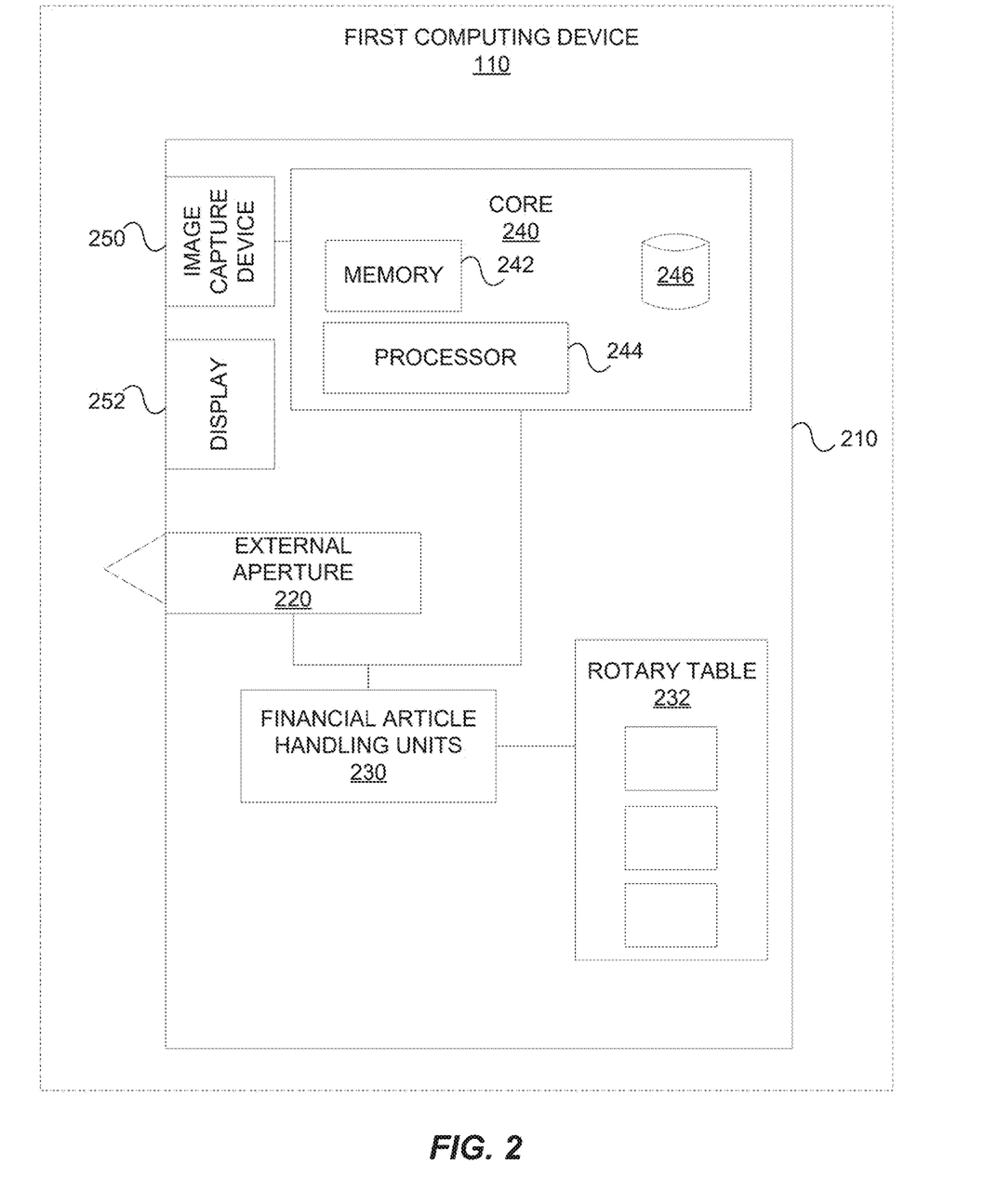
FIG. 2 is a system diagram of a first computing device in accordance with some embodiments of the present disclosure.

An example embodiment of a first computing device 110 is shown in more detail in FIG. 2. The first computing device 110 may include a housing 210, and an external aperture 220 on an external face of the housing 210. The external aperture 220 may connect to an interior of the housing 210. As shown, the external aperture 220 can be at least partially contained on a front area of the housing 210 and at least partially contained within the housing 210. As further discussed below, the external aperture 220 can be configured to receive one or more financial articles, such as in the form of coins (e.g., with a coin hopper), checks (e.g., with a check receiver), or paper bills (e.g., with a bill throat), and to pull the one or more financial articles into the interior of the housing 210 and the first computing device 110. As such, the external aperture 220 can include a shutter (or other such security device) such that the interior of the housing 210 is inaccessible from the external face of the housing 210. The external aperture 220 can be in mechanical communication with financial article handling units 230, as further discussed below, and can transfer the one or more financial articles to the financial article handling units 230 to be processed. As further discussed below, the external aperture 220 can also be configured to dispense one or more financial articles, such as in the form of various currencies and/or denominations.

The first computing device 110 may further include a plurality of financial article handling units 230 each configured to form an interface with the external aperture 220. Examples of the plurality of financial article handling units 230 are shown in greater detail in FIGS. 3 and 4. In some embodiments, each of the financial article handling units 230 may be configured to dispense and/or receive a respective currency (e.g., U.S. dollars, Euros, etc.) and/or a certain amount of a respective currency via the external aperture 220. In some embodiments, each of the financial article handling units 230 may have one or more trays each including a respective denomination of the associated financial article handling unit's respective currency. For example, if a financial article handling unit holds U.S. dollars, it may have a first tray that holds $1 bills, a second tray that holds $5 bills, a third tray that holds $20 bills, and a fourth tray that holds $50 bills.

In some embodiments, the plurality of financial article handling units 230 may be disposed on a moveable component of the first computing device 110, such as a rotary table (e.g., rotary table 232), a track, a conveyor belt, and the like. Such moveable component may be configured such that the first computing device 110, e.g., via the core 240 (discussed below), may rotate or move the plurality of financial article handling units 230 within the housing interior to align particular units with the external aperture 220 depending on the type of request the first computing device 110 receives, as further discussed below.

The financial article handling units 230 can also include various inlets and outlets to provide mechanical communication with other components of first computing device 110. During a transaction, for instance, the first computing device 110 can transfer one or more financial articles from the external aperture 220 (e.g., where the one or more financial articles are received from a customer) to the financial article handling units 230.

The financial article handling units 230 can also receive one or more financial articles from other components of the first computing device 110, such as an interior article storage unit (not shown). Additionally, the financial article handling units 230 can have the ability to transfer one or more financial articles out of the financial article handling units 230 to other components of first computing device 110.

In some embodiments, the first computing device 110 can further include a core 240. The core 240 can include a memory 242, a processor 244, and a storage device 246. These components may be the same as or similar to those components discussed below in FIG. 5 with respect to the first user device 130. The components described in the core 240 can further be in electrical communication with each other, as well as with other components of the first computing device 110. The electrical communication can provide the transfer of power, signals, information, or other similar communications between components. In some embodiments, first computing device 110 may further include an image capture device 250 (e.g., a camera, a scanner, etc.) and a display 252 disposed on an external face of the housing 210.

In some embodiments, the rotary table 232 can further include a series of mechanical drivers configured to articulate the rotary table 232. The series of mechanical drivers can be in communication with the core 240. For example, the series of mechanical drivers can include servos or other motors electronically coupled to the core 240 such that the core 240 can control the mechanical drivers. The mechanical drivers can also include any variations of belts, chains, gears, and the like configured to articulate the rotary table 232 when desired. This series of mechanical drivers can be controlled and/or instructed by the core 240.

The memory 242 can store various instructions, programs, databases, and the like, such as an operating system (OS) (e.g., windows, iOS, Linux), a program to be executed by the financial article handling units 230, or a database in communication with the storage device 246. The core 240 can also provide external communication. For example, the core 240 can communicate over a network (e.g., network 140) with various systems, such as a security system, or a financial service provider system (e.g., financial service provider system 120).

It is understood that the aforementioned examples are meant to be illustrative, and one of ordinary skill in the art would appreciate that several configurations and connections of the various components are possible and contemplated within the scope of this disclosure. Such embodiments as described above allow for efficient and improved processing of transactions, and allow for financial articles to be processed with a greater level of trust to the customer.

Figure 3:
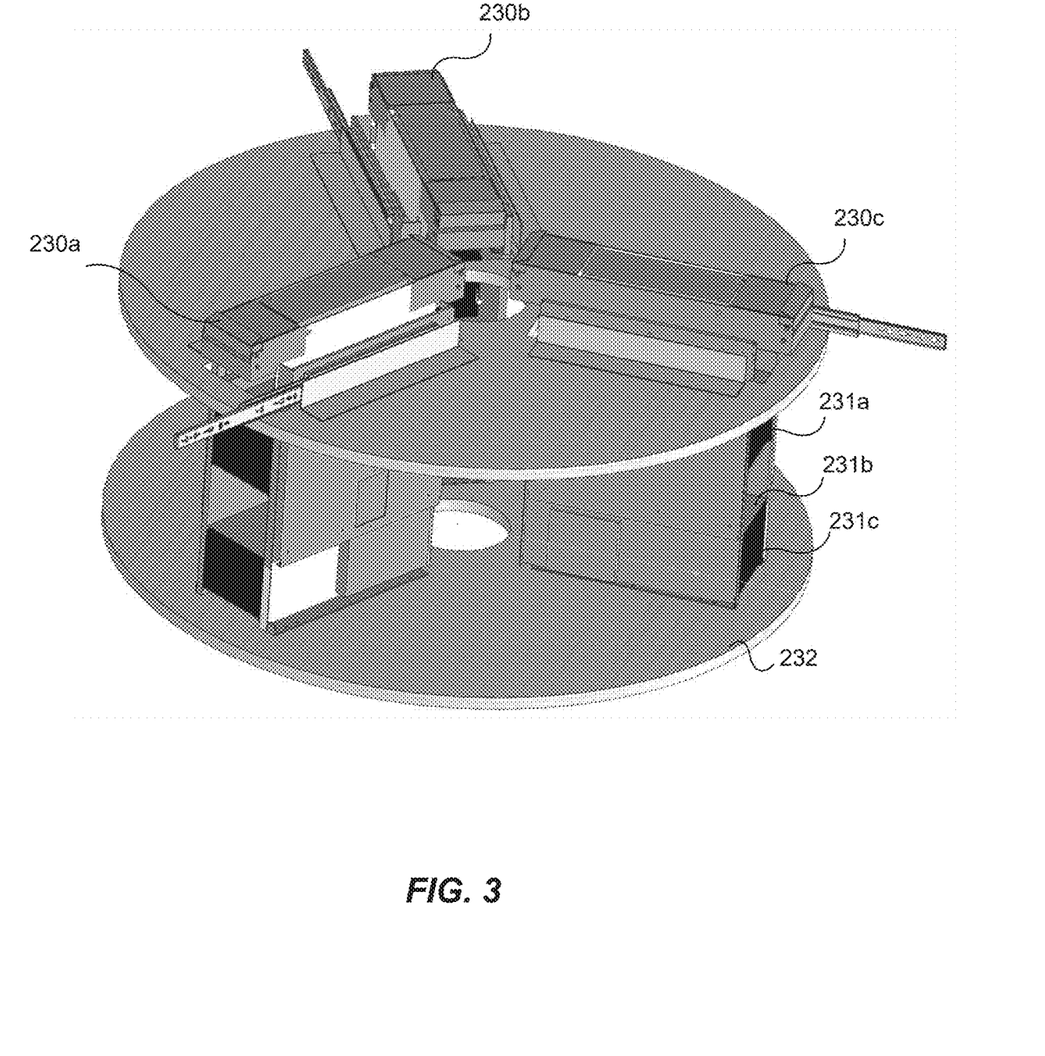
FIG. 3 illustrates a perspective view of a rotary table containing one or more financial article handling units in accordance with some embodiments of the present disclosure.

FIG. 3 provides an example of the plurality of financial article handling units 230. In such example, the plurality of financial article handling units 230 include three separate units 230a, 230b, 230c mounted on a rotary table 232. As discussed herein, it should be understood that units 230a, 230b, and 230c could instead be mounted on a different type of moveable component, such as a conveyor belt. In some embodiments, the plurality of financial article handling units 230 (e.g., 230a, 230b, 230c) are configured such that the first computing device 110 can rotate the rotary table 232 (or move the otherwise moveable component) to respectively align each of the units 230a, 230b, 230c with the external aperture 220. In some embodiments, each of the units 230a, 230b, 230c may align with, or form the interface with, the external aperture 220 by sliding in a first direction (e.g., forward), and may disengage from the external aperture 220 by sliding in a second direction (e.g., backward).

As further discussed below, each financial article handling unit (e.g., 230a, 230b, 230c) may have one or more trays 231a, 231b, 231c, etc. that may each hold a respective denomination of a currency. For example, if unit 230c holds U.S. dollars, tray 231a may hold $50 bills, tray 231b may hold $20 bills, and tray 231c may hold $5 bills.

Although rotary table 232 is illustrated as being circular, it is understood that the rotary table 232 can include any shape so long as the rotary table 232 can articulate within the interior volume of the housing 210. For example, the rotary table 232 can be a conveyor belt with one or more financial article handling units 230 attached thereto. The conveyor belt can articulate (e.g., convey the financial article handling units 230 as desired within the interior volume of the housing 210.) The financial article handling units 230 can also be attached to a belt, chain, or other driving device. Furthermore, the rotary table 232 need not be a solid platter. The financial article handling units 230 can be disposed on other rotating mechanisms.

The rotary table 232 can allow the first computing device 110 to house multiple financial article handling units 230 within the interior volume of the housing 210. Therefore, the inventory or practical storage space of the first computing device 110 can be increased while retaining the same interior volume as defined by the housing 210.

The financial article handling units 230 can be a variety of article handlers. For instance, the financial article handling units 230 can include financial article dispensers, financial article recyclers, financial article storage units, and the like. Suitable examples of financial article handling units 230 can include, but are not limited to, cash dispensers, cash recyclers, coin hoppers, check storage, credit card storage, credit card shredders, check scanners, coin discriminators, and the like. Furthermore, the financial article handling units 230 can include any suitable financial article handler as desired by those of ordinary skill in the art so long as each financial article handling unit is disposed on the rotary table 232.

The financial article handling units 230 can include a plurality of uniform financial article handling units 230. In other words, all units of the financial article handling units 230 can be the same unit. For instance, each financial article handling unit can be a Fujitsu F56 cash dispenser disposed on the rotary table 232. Alternatively, the financial article handling units 230 can include a plurality of dissimilar financial article handling units 230. In other words, there can be a variety of financial article handling units disposed on the rotary table 232. For instance, the rotary table 232 can have one cash dispenser, one cash recycler, one check scanner, and one coin hopper (e.g., one Fujitsu F56, one Diebold Nixdorf RM3, and one Diebold Nixdorf RM4). The composition of the financial article handling units 230 can be changed as desired depending on efficiency and intended use by those of ordinary skill in the art. Given the above-described challenges of currently in-service kiosks, such as ATMs, the disclosed rotary table 232 can increase the capacity of the first computing device 110 by the inclusion of a plurality of financial article handling units 230 disposed on the rotary table 232.

The rotary table 232 can further include a series of mechanical drivers configured to articulate the rotary table 232. The series of mechanical drivers can be in communication with the core 240. For example, the series of mechanical drivers can include servos or other motors electronically coupled to the core 240 such that the core 240 can control the mechanical drivers. The mechanical drivers can also include any variations of belts, chains, gears, and the like configured to articulate the rotary table 232 when desired.

The first computing device 110 (and the housing 210) can be opened if a service technician or other worker wishes to service the first computing device 110 or other components within the housing 210. For example, a cash transporter can open the housing 210 to refill the financial article handling units 230 with cash such that the first computing device 110 can continue to dispense cash. In such a manner, the housing 210 can include various locks, pins, deadbolts, and other similar security devices to ensure that the housing 210 cannot be opened except by a qualified service technician.

Figure 4:
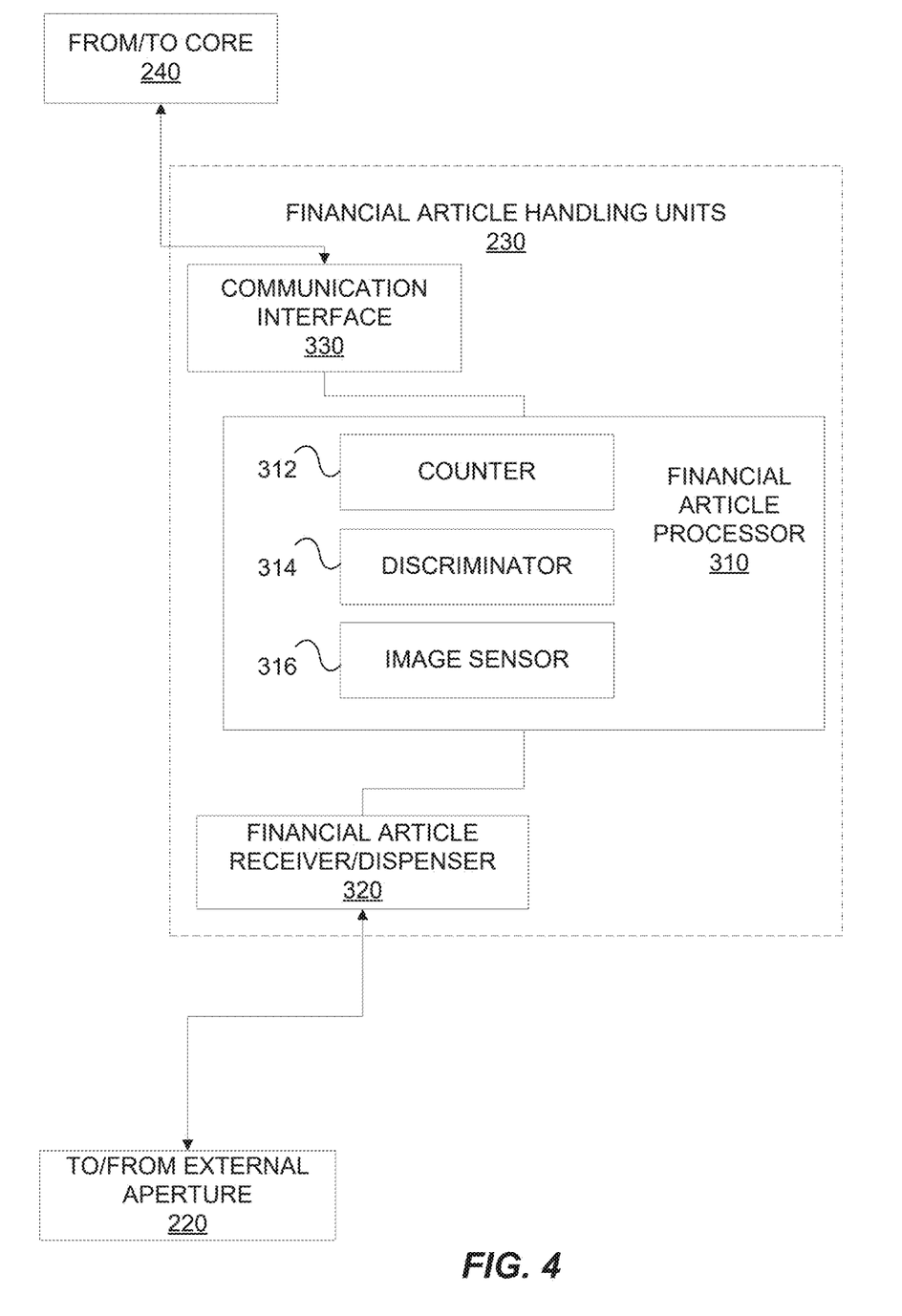
FIG. 4 is a system diagram of the financial article handling unit(s) of FIG. 2 in accordance with some embodiments of the present disclosure.

FIG. 4 illustrates an example of financial article handling units 230 for processing one or more financial articles by a customer of a first computing device 110. The financial article handling units 230 may include a financial article receiver/dispenser 320, a financial article processor 310, and a communication interface 330. The financial article receiver/dispenser 320 can be in communication with external aperture 220 and can receive or dispense one or more financial articles from the external aperture 220.

Upon receiving one or more financial articles, the financial article receiver/dispenser 320 can then transfer the one or more financial articles to the financial article processor 310. The financial article processor 310 can be in mechanical communication with other components of the first computing device 110 and can transfer one or more financial articles out of the first computing device 110. The financial article processor 310 can further be in electrical communication with a communication interface 330, providing a connection with the other components of the first computing device 110 and allowing the financial article handling units 230 to have electrical communication with the core 240.

The financial article processor 310 can include several components for processing one or more financial articles as provided during a transaction. The financial article processor 310 can include, for instance, a financial article counter 312, a discriminator 314, an image sensor 316, and other similar processing components, such as coin sorters, check scanners, size sorters, color sensors, and the like. Other processing components can be present to effectively process one or more financial article. Once the processing is complete, the financial article processor 310 can provide information to the communication interface 330 to send the information elsewhere in the first computing device 110. For example, the financial article processor 310 can obtain a value of the one or more financial articles and provide the value to communication interface 330. The communication interface 330 can then send the value to the core 240 or directly to the display 252 to display the value to the customer.

Additionally, the communication interface 330 can receive instructions or information from elsewhere in the first computing device 110. For instance, the communication interface 330 can receive instructions from the core 240, such as instructions to disconnect from the external aperture 220.

Figure 5:
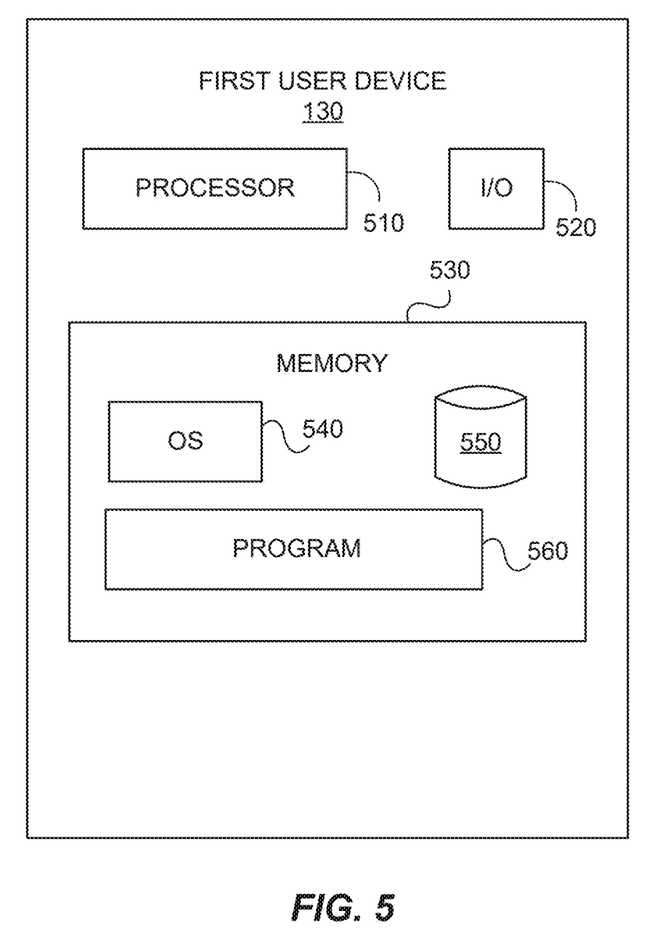
FIG. 5 is a system diagram of a first user device in accordance with some embodiments of the present disclosure.

FIG. 5 provides an example of a first user device 130. As shown, first user device 130 may include a processor 510, an I/O device 520, and a memory 530 containing an OS 540, a database 550, and a program 560.

First user device 130 may be a single server or may be configured as a distributed computer system including multiple servers or computers that interoperate to perform one or more of the processes and functionalities associated with the disclosed embodiments. In some embodiments, first user device 130 may further include a peripheral interface, a transceiver, a mobile network interface in communication with processor 510, a bus configured to facilitate communication between the various components of first user device 130, and a power source configured to power one or more components of first user device 130. A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general-purpose input and output (GPIO) port, a game port, a universal serial bus (USB), a micro-USB port, a high-definition multimedia (HDMI) port, a video port, an audio port, a Bluetooth™ port, an NFC port, another like communication interface, or any combination thereof.

In some embodiments, a transceiver may be configured to communicate with compatible devices and ID tags when they are within a predetermined range. A transceiver may be compatible with one or more of: RFID, NFC, Bluetooth™, low-energy Bluetooth™ (BLE), WiFi™, ZigBee™, ABC protocols or similar technologies.

A mobile network interface may provide access to a cellular network, the Internet, or another wide-area network. In some embodiments, a mobile network interface may include hardware, firmware, and/or software that allows processor 510 to communicate with other devices via wired or wireless networks, whether local or wide area, private or public, as known in the art. A power source may be configured to provide an appropriate alternating current (AC) or direct current (DC) to power components.

Processor 510 may include one or more of a microprocessor, microcontroller, digital signal processor, co-processor or the like or combinations thereof capable of executing stored instructions and operating upon stored data. Memory 530 may include, in some implementations, one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files, including an operating system, application programs (including, e.g., a web browser application, a widget or gadget engine, or other applications, as necessary), executable instructions, and data. In one embodiment, the processing techniques described herein are implemented as a combination of executable instructions and data within memory 230.

Processor 510 may be one or more known processing devices, such as a microprocessor from the Pentium™ family manufactured by Intel™ or the Turion™ family manufactured by AMD™. Processor 510 may constitute a single core or multiple core processor that executes parallel processes simultaneously. For example, processor 510 may be a single core processor that is configured with virtual processing technologies. In certain embodiments, processor 510 may use logical processors to simultaneously execute and control multiple processes. Processor 510 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

First user device 130 may include one or more storage devices configured to store information used by processor 510 (or other components) to perform certain functions related to the disclosed embodiments. In one example, first user device 130 may include memory 530 that includes instructions to enable processor 510 to execute one or more applications, such as server applications, network communication processes, and any other type of application or software known to be available on computer systems. Alternatively, the instructions, application programs, etc., may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, first user device 130 may include memory 530 that includes instructions that, when executed by processor 510, perform one or more processes consistent with the functionalities disclosed herein. Methods, systems, and articles of manufacture consistent with disclosed embodiments are not limited to separate programs or computers configured to perform dedicated tasks. For example, first user device 130 may include memory 530 that may include one or more programs 560 to perform one or more functions of the disclosed embodiments. Moreover, processor 510 may execute one or more programs 560 located remotely from first user device 130. For example, first user device 130 may access one or more remote programs 560, that, when executed, perform functions related to disclosed embodiments.

Memory 530 may include one or more memory devices that store data and instructions used to perform one or more features of the disclosed embodiments. Memory 530 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational databases. Memory 530 may include software components that, when executed by processor 510, perform one or more processes consistent with the disclosed embodiments. In some embodiments, memory 530 may include database 550 for storing related data to enable first user device 130 to perform one or more of the processes and functionalities associated with the disclosed embodiments.

First user device 130 may also be communicatively connected to one or more memory devices (e.g., databases (not shown)) locally or through a network. The remote memory devices may be configured to store information and may be accessed and/or managed by first user device 130. By way of example, the remote memory devices may be document management systems, Microsoft™ SQL database, SharePoint™ databases, Oracle™ databases, Sybase™ databases, or other relational databases. Systems and methods consistent with disclosed embodiments, however, are not limited to separate databases or even to the use of a database.

First user device 130 may also include one or more I/O devices 520 that may include one or more interfaces for receiving signals or input from devices and providing signals or output to one or more devices that allow data to be received and/or transmitted by first user device 130. For example, first user device 130 may include interface components, which may provide interfaces to one or more input devices, such as one or more keyboards, mouse devices, touch screens, track pads, trackballs, scroll wheels, digital cameras, microphones, sensors, and the like, that enable first user device 130 to receive data from one or more users.

In example embodiments of the disclosed technology, first user device 130 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While first user device 130 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations may include a greater or lesser number of components than those illustrated.

Figure 6:
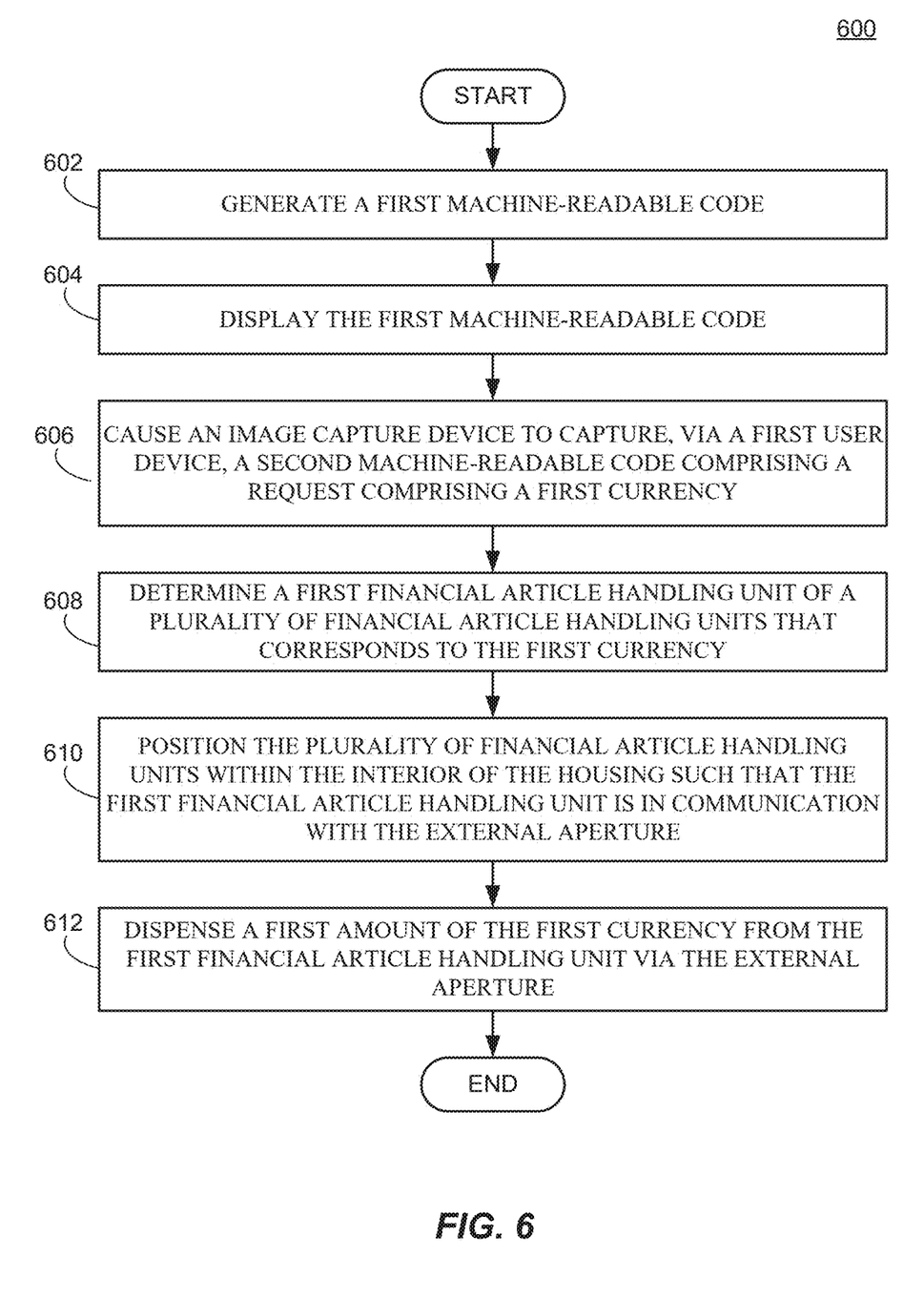
FIG. 6 is a flowchart of a method for processing financial articles in accordance with some embodiments of the present disclosure.

FIG. 6 provides a flowchart of an exemplary method 600 for processing financial articles. The steps of method 600 may be performed by one or more components of the system 100 (e.g., first computing device 110, or first user device 130). It should be understood that certain embodiments of the disclosed technology may omit one or more blocks as being optional.

In block 602, the system (e.g., first computing device 110) may generate a first machine-readable code. The first machine-readable code may be, for example, a QR code, and may include identification data associated with the first computing device 110. For example, the QR code may include embedded identification data (e.g., a serial number) associated with the first computing device 110 such that a second device, e.g., first user device 130, may securely communicate with the first computing device 110, as further discussed below.

In block 604, the system (e.g., first computing device 110) may display the first machine-readable code. For example, first computing device 110 may display the first machine-readable code via display 252, such that a user may capture the code via a second device, e.g., first user device 130, as further discussed below. In some embodiments, the first computing device 110 may be configured to periodically and/or continuously generate and display a new first machine-readable code, an added benefit of such feature being to maintain enhanced security between the first computing device 110 and first user device 130 once the two devices begin communicating, as further discussed below. That is, periodically refreshing the code displayed by the first computing device 110 may reduce unwanted access or capturing by third parties (e.g., other users in the vicinity of the first computing device 110).

In some embodiments, responsive to displaying the first machine-readable code, the first computing device 110 may establish a wireless connection with the first user device 130. That is, once the first user device 130 captures the first machine-readable code, as further discussed below, the first computing device and first user device 130 may be connected and subsequently communicate with one another via the wireless connection.

In block 606, the system (e.g., first computing device 110) may cause an image capture device (e.g., image capture device 250) to capture, via a first user device (e.g., first user device 130) a second machine-readable code including a request. For example, as further discussed below, a user of first user device 130 may log into an account via the first user device 130. Once in the user's account, the user may initiate a transaction request, such as a currency exchange request. The user may enter various inputs via a graphical user interface (GUI) of a mobile application via the first user device 130. These inputs may include an amount, a currency (e.g., U.S. dollars, Euros, etc.), and/or a denomination. Once the user has entered the inputs associated with the user's request, the first user device 130, e.g., via the mobile application, may generate a machine-readable code (e.g., a QR code) that includes the details or inputs of the user's request. The first user device 130 may then be configured to display the machine-readable code such that the first computing device 110 may capture the displayed code via, e.g., image capture device 250, and receive the user's request via the captured code.

In block 608, responsive to capturing the second machine-readable code, the system (e.g., first computing device 110) may determine a first financial article handling unit of a plurality of financial handling units (e.g., 230) that corresponds to the request. For example, if the request included a first currency, the first computing device 110 may determine which financial article handling unit holds financial articles (e.g., bills) of the first currency. As another example, if the request included a first currency and a first amount, the first computing device 110 may determine which financial article handling unit holds at least the first amount of the first currency such that the first computing device 110 may fulfil the request, as further discussed below.

In some embodiments, the first computing device 110 may first determine the first financial article handling unit corresponds to the requested currency, and upon making that determination, may subsequently determine whether the first financial article handling unit is currently holding the requested amount of the requested currency. If the first computing device 110 determines the first financial article handling unit is not holding the requested amount of the requested currency, the first computing device 110 may determine a second financial article handling unit that is holding the requested amount of the requested currency. Such feature provides an added benefit of redundancy in the first computing device 110. That is, the first computing device 110 may include multiple financial article handling units that each hold the same currency such that if one unit is running low in inventory, the first computing device 110 may switch to another unit to be able to fulfill the user's request.

In some embodiments, the first computing device 110 may first determine the first financial article handling unit corresponds to the requested currency, and upon making that determination, may subsequently determine whether the first financial article handling unit is currently holding a threshold amount of the requested currency. For example, the first computing device 110 may be configured to determine whether there is at least a certain percentage or amount extra over the user's requested amount (or calculated or required amount) in the first financial article handling unit before fulfilling the user's request. In some embodiments, if the computing device 110 determines there is not a threshold amount of the requested currency, the first computing device 110 may be configured to transmit an alert to an external server. In some embodiments, if the computing device 110 determines there is not a threshold amount of the requested currency, the first computing device 110 may be configured to determine a second financial article handling unit of the plurality of financial article handling units 230 that contains the threshold amount, to align the second financial article handling unit with the external aperture, and to fulfill the user's request by dispensing appropriate funds through the second financial article handling unit, as discussed herein. These features provide an added benefit of ensuring the first computing device 110 maintains sufficient inventory to handle users' various requests.

In block 610, the system (e.g., first computing device 110) may position the plurality of financial handling units such that the first financial article handling unit is in communication with the external aperture (e.g., 220). For example, once the first computing device 110 determines which of the financial handling units corresponds to the user's request (e.g., holds the correct type of currency, the correct amount, and/or the correct denominations), the first computing device 110 may position or arrange the plurality of financial article handling units within the housing interior, such as by rotating a rotary table, or moving the units along a conveyor belt, until the determined unit is aligned with the external aperture.

In block 612, the system (e.g., first computing device 110) may dispense a first amount of the first currency from the first financial article handling unit via the external aperture. For example, the first computing device 110 may fulfill the user's request by dispensing an amount (e.g., the user's requested amount, or a calculated amount) of the first currency. In some embodiments where the user's request includes only a currency, but no amount, the first computing device 110 may be configured to calculate the correct amount of the requested currency to fulfill the user's request. For example, the user's request may indicate the user would like the equivalent of $300 in Euros. As such, the first computing device 110 may be configured to calculate or convert $300 into Euros based on a current exchange rate between U.S. dollars and Euros, and dispense the correct or calculated amount of Euros to fulfill the user's request. In some embodiments, the first computing device 110 may be configured to make a foreign currency exchange calculation, as in the above example, and deduct some amount of money from an account associated with the user as part of fulfilling the user's request. In the above example, the first computing device 110 may be configured to first deduct the $300 from the user's account before calculating and dispensing the equivalent amount in Euros.

In some embodiments where the user's request includes certain denomination(s) the user would like in a certain currency, the first computing device 110 may be configured not only to position the first financial article handling unit in communication with the external aperture, but also to determine which tray(s) of the first financial article handling unit hold the requested denomination(s), and align each tray(s) with the external aperture such that the correct denomination(s) may be dispensed via the external aperture.

In some embodiments, the first computing device 110 may be further configured to receive an amount of a currency from a user. For example, a user may submit a currency exchange request via a mobile application on the user's mobile device (e.g., first user device 130), in which the user inputs a request to exchange $500 for an equivalent amount in Euros. The user may then input the $500 cash into the external aperture 220 of first computing device 110 such that first computing device 110 can proceed to fulfill the user's request, as discussed herein.

Exemplary Use Cases

The following exemplary use cases describe examples of a typical user flow pattern. They are intended solely for explanatory purposes and not limitation.

In one example, a user may open a mobile application on the user's mobile device (e.g., first user device 130). Within the mobile application, the user may enter a currency exchange request by moving through a series of inputs via a GUI of the mobile application, where the inputs enable the user to select and/or enter one or more details of the user's request. In entering the request, the user may enter that the user would like to exchange $500 for the equivalent amount of Euros. The user may also enter that the user would like the final amount of Euros in at least two different denominations, such as 20- and 10-Euro banknotes. The user may submit the request, prompting the mobile device (e.g., via the mobile application) to generate a QR code with the embedded request.

The user may later walk into a store or café where a foreign currency exchange kiosk (e.g., first computing device 110) is located. The user may walk up to the kiosk and open the user's mobile application on the mobile device to display the previously generated QR code. With the QR code displayed on the user's mobile device screen, the user may hold the mobile device up to the kiosk's scanner such that the kiosk may capture the user's QR code, and consequently, receive the details of the user's previously submitted currency exchange request.

Upon receiving the request, the kiosk may communicate with a financial service provider system (e.g., 120) to identify an account associated with the user (e.g., one the user previously identified when entering the request via the mobile application), and may deduct $500 from the account. The kiosk may then conduct a foreign exchange calculation to determine how many Euros are equivalent to $500 based on the current exchange rate. Once the kiosk calculates the correct amount of Euros, the kiosk may determine which financial article handling unit or dispenser in its interior holds Euros. Once the kiosk identifies the correct unit, the kiosk may determine whether that unit holds the correct amount and the correct denominations (e.g., at least some 20- and 10-Euro banknotes) of Euros to fulfill the user's request. Upon making such determination, the kiosk may rearrange a plurality of financial article handling units within its housing interior, such as by moving the different units along a conveyor belt, until the identified/correct unit is properly aligned with the kiosk's external aperture. The kiosk may then arrange the trays of the identified unit (e.g., by moving them up or down) to ensure a first tray holding 20-Euro banknotes is in communication with the external aperture, and may dispense a first amount of the 20-Euro banknotes. The kiosk may then arrange the trays again such that a second tray holding 10-Euro banknotes is in communication with the external aperture, and may dispense a second amount of the 10-Euro banknotes. The kiosk may then determine whether it has been able to fulfill the user's request via only dispensing the 20- and 10-Euro banknotes, and if not, may arrange the trays again to dispense Euros in one or more additional denominations from other respective trays until the kiosk has dispensed the full amount of Euros to fulfill the user's request.

In another example, the scenario may be similar to the above example, except that the user may walk up to a kiosk without having previously submitted a request. In such situation, the user may see a QR code displayed on the kiosk display. The user may use his/her mobile device (e.g., with the camera) to scan the displayed QR code. The user's mobile device may then be wirelessly connected to the kiosk, and the user's mobile device may recognize the specific kiosk to which it is connected. Scanning the kiosk's displayed QR code may prompt a mobile application to open on the user's mobile device (e.g., associated with a financial institution). The remaining steps of this example may be similar to those in the above example. That is, the user may enter details of a currency exchange request within the mobile application to generate and display a QR code, and the kiosk may capture the QR code displayed on the user's mobile device in order to fulfill the user's request.

In some examples, disclosed systems or methods may involve one or more of the following clauses:

Clause 1: A system, comprising: a housing; an external aperture on an external face of the housing, the external aperture connecting to an interior of the housing; a plurality of financial article handling units each configured to form an interface with the external aperture and to dispense a first amount of a respective currency via the external aperture; one or more processors in communication with the external aperture and the plurality of financial article handling units; an image capture device; and a memory in communication with the one or more processors and storing instructions that, when executed by the one or more processors, are configured to cause the system to: cause the image capture device to capture, via a first user device, a first machine-readable code, wherein the first machine-readable code comprises a request comprising the first amount and a first currency; and responsive to capturing the first machine-readable code: determine a first financial article handling unit of the plurality of financial article handling units that corresponds to the first currency; position the plurality of financial article handling units within the interior of the housing such that the first financial article handling unit is in communication with the external aperture; and dispense the first amount of the first currency from the first financial article handling unit via the external aperture.

Clause 2: The system of clause 1, wherein the request further comprises one or more denominations, and wherein the instructions are further configured to cause the system to: responsive to capturing the first machine-readable code, cause the first financial article handling unit to dispense the first amount of the first currency in the one or more denominations via the external aperture.

Clause 3: The system of clause 1, wherein the instructions are further configured to cause the system to: responsive to determining the first financial article handling unit corresponds to the first currency, determine whether the first financial article handling unit comprises the first amount of the first currency; and responsive to determining the first financial article handling unit does not comprise the first amount of the first currency: determine a second financial article handling unit of the plurality of financial article handling units that comprises the first amount of the first currency; position the plurality of financial article handling units within the interior of the housing such that the second financial article handling unit is in communication with the external aperture; and dispense the first amount of the first currency from the second financial article handling unit via the external aperture.

Clause 4: The system of clause 1, wherein the plurality of financial article handling units are disposed on a rotary table, and wherein positioning the plurality of financial article handling units within the interior of the housing such that the first financial article handling unit is in communication with the external aperture comprises rotating the rotary table until the first financial article handling unit is aligned with the external aperture.

Clause 5: The system of clause 1, wherein each of the plurality of financial article handling units is configured to form the interface with the external aperture by sliding forward.

Clause 6: The system of clause 5, wherein each of the plurality of financial article handling units is configured to disengage from the interface with the external aperture by sliding backward.

Clause 7: The system of clause 1, wherein the plurality of financial article handling units are each configured to form the interface with the external aperture to receive a second amount of a second currency via the external aperture, wherein the request further comprises the second currency, and wherein the instructions are further configured to cause the system to: determine a second financial article handling unit of the plurality of financial article handling units that corresponds to the second currency; position the plurality of financial article handling units within the interior of the housing such that the second financial article handling unit is in communication with the external aperture; and receive, by the second financial article handling unit and via the external aperture, the second amount of the second currency.

Clause 8: The system of clause 1, wherein the instructions are further configured to cause the system to: responsive to determining the first financial article handling unit corresponds to the first currency, determine whether the first financial article handling unit comprises a threshold amount of the first currency; and responsive to determining the first financial article handling unit does not comprise the threshold amount of the first currency, transmit an alert to an external server.

Clause 9: The system of clause 8, wherein: responsive to determining the first financial article handling unit does not comprise the threshold amount of the first currency, determine a second financial article handling unit of the plurality of financial article handling units that comprises the threshold amount of the first currency; position the plurality of financial article handling units within the interior of the housing such that the second financial article handling unit is in communication with the external aperture; and dispense the first amount of the first currency from the second financial article handling unit via the external aperture.

Clause 10: A system, comprising: a housing; an external aperture on an external face of the housing, the external aperture connecting to an interior of the housing; a plurality of financial article handling units each configured to form an interface with the external aperture and to dispense a respective currency via the external aperture, and each comprising one or more trays each comprising a respective denomination of the respective currency; one or more processors in communication with the external aperture and the plurality of financial article handling units; an image capture device; and a memory in communication with the one or more processors and storing instructions that, when executed by the one or more processors, are configured to cause the system to: cause the image capture device to capture, via a first user device, a first machine-readable code, wherein the first machine-readable code comprises a request comprising a first denomination of a first currency; and responsive to capturing the first machine-readable code: determine a first financial article handling unit of the plurality of financial article handling units that corresponds to the first currency; position the one or more trays of the first financial article handling unit such that a first tray of the one or more trays of the first financial article handling unit is in communication with the external aperture, the first tray comprising the first denomination; and dispense the first denomination of the first currency from the first financial article handling unit via the external aperture.

Clause 11: The system of clause 10, wherein the instructions are further configured to cause the system to: responsive to determining the first financial article handling unit of the plurality of financial article handling units corresponds to the first currency, position the plurality of financial article handling units within the interior of the housing such that the first financial article handling unit is in communication with the external aperture.

Clause 12: The system of clause 10, wherein: the plurality of financial article handling units are each further configured to receive a first amount of a second currency via the external aperture; the request further comprises the second currency; and the instructions are further configured to cause the system to: determine a second financial article handling unit of the plurality of financial article handling units that corresponds to the second currency; position the plurality of financial article handling units within the interior of the housing such that the second financial article handling unit is in communication with the external aperture; and receive, by the second financial article handling unit and via the external aperture, the first amount of the second currency.

Clause 13: The system of clause 10, wherein the instructions are further configured to cause the system to: responsive to determining the first financial article handling unit corresponds to the first currency, determining whether the first financial article handling unit comprises a threshold amount of the first currency; and responsive to determining the first financial article handling unit does not comprise the threshold amount of the first currency, transmitting an alert to an external server.

Clause 14: The system of clause 13, wherein the instructions are further configured to cause the system to: responsive to determining the first financial article handling unit does not comprise the threshold amount of the first currency, determining a second financial article handling unit of the plurality of financial article handling units that comprises the threshold amount of the first currency; positioning the plurality of financial article handling units within the interior of the housing such that the second financial article handling unit is in communication with the external aperture; and dispensing a first amount of the first currency from the second financial article handling unit via the external aperture.

Clause 15: A first computing device, comprising: a housing; a display; an external aperture on an external face of the housing, the external aperture connecting to an interior of the housing; a plurality of financial article handling units each configured to form an interface with the external aperture and to dispense a respective currency via the external aperture; one or more processors in communication with the external aperture and the plurality of financial article handling units; and a memory in communication with the one or more processors and storing instructions that, when executed by the one or more processors, are configured to cause the first computing device to: generate a first machine-readable code comprising identification data of the first computing device; display the first machine-readable code via the display; receive, from a first user device, a request comprising a first currency; responsive to receiving the request: determine a first financial article handling unit of the plurality of financial article handling units that corresponds to the first currency; position the plurality of financial article handling units within the interior of the housing such that the first financial article handling unit is in communication with the external aperture; and dispense a first amount of the first currency from the first financial article handling unit via the external aperture.

Clause 16: The first computing device of clause 15, wherein the request further comprises a second amount and a second currency, and wherein the instructions are further configured to cause the first computing device to: deduct the second amount of the second currency from an account associated with a user of the first user device.

Clause 17: The first computing device of clause 15, wherein the instructions are further configured to cause the first computing device to: receive the request via a mobile application running on the first user device.

Clause 18: The first computing device of clause 15, wherein the instructions are further configured to cause the first computing device to: responsive to displaying the first machine-readable code, establish a wireless connection with the first user device, wherein the request is received via the wireless connection.

Clause 19: The first computing device of clause 15, wherein the first computing device further comprises an image capture device, and wherein the instructions are further configured to cause the first computing device to: cause the image capture device to capture, via the first user device, a second machine-readable code, wherein the second machine-readable code comprises the request.

Clause 20: The first computing device of clause 15, wherein the instructions are further configured to cause the first computing device to: responsive to determining the first financial article handling unit corresponds to the first currency, determine whether the first financial article handling unit comprises a threshold amount of the first currency; and responsive to determining the first financial article handling unit does not comprise the threshold amount of the first currency: transmit an alert to an external server; determine a second financial article handling unit of the plurality of financial article handling units that comprises the threshold amount of the first currency; position the plurality of financial article handling units within the interior of the housing such that the second financial article handling unit is in communication with the external aperture; and dispense the first amount of the first currency from the second financial article handling unit via the external aperture.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

While the present disclosure has been described in connection with a plurality of exemplary aspects, as illustrated in the various figures and discussed above, it is understood that other similar aspects can be used, or modifications and additions can be made, to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A system, comprising:
a housing;
an external aperture on an external face of the housing, the external aperture connecting to an interior of the housing;
a plurality of financial article handling units each configured to form an interface with the external aperture and to dispense a first amount of a respective currency via the external aperture;
one or more processors in communication with the external aperture and the plurality of financial article handling units;
an image capture device; and
a memory in communication with the one or more processors and storing instructions that, when executed by the one or more processors, are configured to cause the system to:
cause the image capture device to capture, via a first user device, a first machine-readable code, wherein the first machine-readable code comprises a request comprising the first amount and a first currency; and
responsive to capturing the first machine-readable code:
determine a first financial article handling unit of the plurality of financial article handling units that corresponds to the first currency;
position the plurality of financial article handling units within the interior of the housing such that the first financial article handling unit is in communication with the external aperture; and
dispense the first amount of the first currency from the first financial article handling unit via the external aperture.

2. The system of claim 1, wherein the request further comprises one or more denominations, and wherein the instructions are further configured to cause the system to:
responsive to capturing the first machine-readable code, cause the first financial article handling unit to dispense the first amount of the first currency in the one or more denominations via the external aperture.

3. The system of claim 1, wherein the instructions are further configured to cause the system to:
responsive to determining the first financial article handling unit corresponds to the first currency, determine whether the first financial article handling unit comprises the first amount of the first currency; and
responsive to determining the first financial article handling unit does not comprise the first amount of the first currency:
determine a second financial article handling unit of the plurality of financial article handling units that comprises the first amount of the first currency;
position the plurality of financial article handling units within the interior of the housing such that the second financial article handling unit is in communication with the external aperture; and
dispense the first amount of the first currency from the second financial article handling unit via the external aperture.

4. The system of claim 1, wherein the plurality of financial article handling units are disposed on a rotary table, and wherein positioning the plurality of financial article handling units within the interior of the housing such that the first financial article handling unit is in communication with the external aperture comprises rotating the rotary table until the first financial article handling unit is aligned with the external aperture.

5. The system of claim 1, wherein each of the plurality of financial article handling units is configured to form the interface with the external aperture by sliding forward.

6. The system of claim 5, wherein each of the plurality of financial article handling units is configured to disengage from the interface with the external aperture by sliding backward.

7. The system of claim 1, wherein the plurality of financial article handling units are each configured to form the interface with the external aperture to receive a second amount of a second currency via the external aperture, wherein the request further comprises the second currency, and wherein the instructions are further configured to cause the system to:
determine a second financial article handling unit of the plurality of financial article handling units that corresponds to the second currency;
position the plurality of financial article handling units within the interior of the housing such that the second financial article handling unit is in communication with the external aperture; and
receive, by the second financial article handling unit and via the external aperture, the second amount of the second currency.

8. The system of claim 1, wherein the instructions are further configured to cause the system to:
responsive to determining the first financial article handling unit corresponds to the first currency, determine whether the first financial article handling unit comprises a threshold amount of the first currency; and
responsive to determining the first financial article handling unit does not comprise the threshold amount of the first currency, transmit an alert to an external server.

9. The system of claim 8, wherein:
responsive to determining the first financial article handling unit does not comprise the threshold amount of the first currency,
determine a second financial article handling unit of the plurality of financial article handling units that comprises the threshold amount of the first currency;
position the plurality of financial article handling units within the interior of the housing such that the second financial article handling unit is in communication with the external aperture; and
dispense the first amount of the first currency from the second financial article handling unit via the external aperture.

10. A system, comprising:
a housing;
an external aperture on an external face of the housing, the external aperture connecting to an interior of the housing;
a plurality of financial article handling units each configured to form an interface with the external aperture and to dispense a respective currency via the external aperture, and each comprising one or more trays each comprising a respective denomination of the respective currency;
one or more processors in communication with the external aperture and the plurality of financial article handling units;
an image capture device; and
a memory in communication with the one or more processors and storing instructions that, when executed by the one or more processors, are configured to cause the system to:
cause the image capture device to capture, via a first user device, a first machine-readable code, wherein the first machine-readable code comprises a request comprising a first denomination of a first currency; and
responsive to capturing the first machine-readable code:
determine a first financial article handling unit of the plurality of financial article handling units that corresponds to the first currency;
position the one or more trays of the first financial article handling unit such that a first tray of the one or more trays of the first financial article handling unit is in communication with the external aperture, the first tray comprising the first denomination; and
dispense the first denomination of the first currency from the first financial article handling unit via the external aperture.

11. The system of claim 10, wherein the instructions are further configured to cause the system to:
responsive to determining the first financial article handling unit of the plurality of financial article handling units corresponds to the first currency, position the plurality of financial article handling units within the interior of the housing such that the first financial article handling unit is in communication with the external aperture.

12. The system of claim 10, wherein:
the plurality of financial article handling units are each further configured to receive a first amount of a second currency via the external aperture;
the request further comprises the second currency; and
the instructions are further configured to cause the system to:
determine a second financial article handling unit of the plurality of financial article handling units that corresponds to the second currency;
position the plurality of financial article handling units within the interior of the housing such that the second financial article handling unit is in communication with the external aperture; and receive, by the second financial article handling unit and via the external aperture, the first amount of the second currency.

13. The system of claim 10, wherein the instructions are further configured to cause the system to:

responsive to determining the first financial article handling unit corresponds to the first currency, determining whether the first financial article handling unit comprises a threshold amount of the first currency; and responsive to determining the first financial article handling unit does not comprise the threshold amount of the first currency, transmitting an alert to an external server.

14. The system of claim 13, wherein the instructions are further configured to cause the system to:

responsive to determining the first financial article handling unit does not comprise the threshold amount of the first currency, determining a second financial article handling unit of the plurality of financial article handling units that comprises the threshold amount of the first currency;

positioning the plurality of financial article handling units within the interior of the housing such that the second financial article handling unit is in communication with the external aperture; and dispensing a first amount of the first currency from the second financial article handling unit via the external aperture.

15. A first computing device, comprising:

a housing;

a display;

an external aperture on an external face of the housing, the external aperture connecting to an interior of the housing;

a plurality of financial article handling units each configured to form an interface with the external aperture and to dispense a respective currency via the external aperture;

one or more processors in communication with the external aperture and the plurality of financial article handling units; and a memory in communication with the one or more processors and storing instructions that, when executed by the one or more processors, are configured to cause the first computing device to:

generate a first machine-readable code comprising identification data of the first computing device;

display the first machine-readable code via the display;

receive, from a first user device, a request comprising a first currency;

responsive to receiving the request:

determine a first financial article handling unit of the plurality of financial article handling units that corresponds to the first currency;

position the plurality of financial article handling units within the interior of the housing such that the first financial article handling unit is in communication with the external aperture; and dispense a first amount of the first currency from the first financial article handling unit via the external aperture.

16. The first computing device of claim 15, wherein the request further comprises a second amount and a second currency, and wherein the instructions are further configured to cause the first computing device to:

deduct the second amount of the second currency from an account associated with a user of the first user device.

17. The first computing device of claim 15, wherein the instructions are further configured to cause the first computing device to:

receive the request via a mobile application running on the first user device.

18. The first computing device of claim 15, wherein the instructions are further configured to cause the first computing device to:

responsive to displaying the first machine-readable code, establish a wireless connection with the first user device, wherein the request is received via the wireless connection.

19. The first computing device of claim 15, wherein the first computing device further comprises an image capture device, and wherein the instructions are further configured to cause the first computing device to:

cause the image capture device to capture, via the first user device, a second machine-readable code, wherein the second machine-readable code comprises the request.

20. The first computing device of claim 15, wherein the instructions are further configured to cause the first computing device to:

responsive to determining the first financial article handling unit corresponds to the first currency, determine whether the first financial article handling unit comprises a threshold amount of the first currency; and responsive to determining the first financial article handling unit does not comprise the threshold amount of the first currency:

transmit an alert to an external server;

determine a second financial article handling unit of the plurality of financial article handling units that comprises the threshold amount of the first currency;

position the plurality of financial article handling units within the interior of the housing such that the second financial article handling unit is in communication with the external aperture; and dispense the first amount of the first currency from the second financial article handling unit via the external aperture.

* * * * *